United States Patent
Usgaonkar et al.

(10) Patent No.: US 9,684,532 B2
(45) Date of Patent: Jun. 20, 2017

(54) VIRTUAL MACHINE REBOOT INFORMATION PERSISTENCE INTO HOST MEMORY

(71) Applicant: NetApp Inc., Sunnyvale, CA (US)

(72) Inventors: Ameya Prakash Usgaonkar, Old Goa (IN); Mangesh Chitnis, Mumbai (IN); Shehbaz Jaffer, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 93 days.

(21) Appl. No.: 14/465,877

(22) Filed: Aug. 22, 2014

(65) Prior Publication Data

US 2016/0055018 A1 Feb. 25, 2016

(51) Int. Cl.
*G06F 9/455* (2006.01)
*G06F 9/44* (2006.01)

(52) U.S. Cl.
CPC ........ *G06F 9/45558* (2013.01); *G06F 9/4401* (2013.01); *G06F 2009/45575* (2013.01); *G06F 2009/45583* (2013.01); *G06F 2009/45591* (2013.01)

(58) Field of Classification Search
None
See application file for complete search history.

(56) References Cited

U.S. PATENT DOCUMENTS

| | | | | |
|---|---|---|---|---|
| 5,510,630 A * | 4/1996 | Agarwal | ............. | H01L 21/8213 257/296 |
| 2008/0082808 A1* | 4/2008 | Rothman | .............. | G06F 9/4401 713/1 |
| 2013/0024857 A1* | 1/2013 | Yusupov | ............... | G06F 9/5077 718/1 |
| 2013/0283298 A1* | 10/2013 | Ali | ........................ | G06F 9/5077 719/319 |
| 2014/0297938 A1* | 10/2014 | Puthiyedath | ............ | G06F 12/08 711/105 |
| 2015/0358417 A1* | 12/2015 | Patil | .................... | H04L 67/1097 709/219 |

\* cited by examiner

*Primary Examiner* — Emerson Puente
*Assistant Examiner* — Steven Do
(74) *Attorney, Agent, or Firm* — Gilliam IP PLLC

(57) ABSTRACT

A host machine may host a virtual machine. Virtual machine reboot information, used to reboot the virtual machine in the event of a failure or restart of the virtual machine, may be identified (e.g., file system metadata buffers, a virtual non-volatile random access memory log, user data buffers, and/or data used to reboot the virtual machine such as to perform a reboot mounting operation and/or a reboot replay operation of a volume of data associated with the virtual machine). The virtual machine reboot information may be cached within relatively fast host memory of the host machine (e.g., instead of merely within a relatively slower hard drive or other storage device). In this way, the cached virtual machine reboot information may be quickly retrieved so that the virtual machine may be rebooted in a relatively shorter amount of time.

17 Claims, 8 Drawing Sheets

VIRTUAL MACHINE REBOOT INFORMATION PERSISTENCE INTO HOST MEMORY

BACKGROUND

A virtual machine may be hosted on a host machine, such as by a hypervisor. The virtual machine may store information, such as a guest operating system, user files, application data, and/or other data, within a virtual machine storage file (e.g., a virtual machine disk (vmdk) file). The virtual machine storage file may be stored within persistent storage, such as a hard drive or other storage device, of the host machine. If a failure of the virtual machine occurs, then the virtual machine may be rebooted into an operational state. Rebooting the virtual machine may be a relatively slow process because virtual machine reboot information may be retrieved from the relatively slow persistent storage of the host machine. If the virtual machine hosts a virtual storage appliance that provides a user with access to data stored within one or more storage devices, then such access may be unavailable until the virtual machine is rebooted.

DETAILED DESCRIPTION

Figure 1:
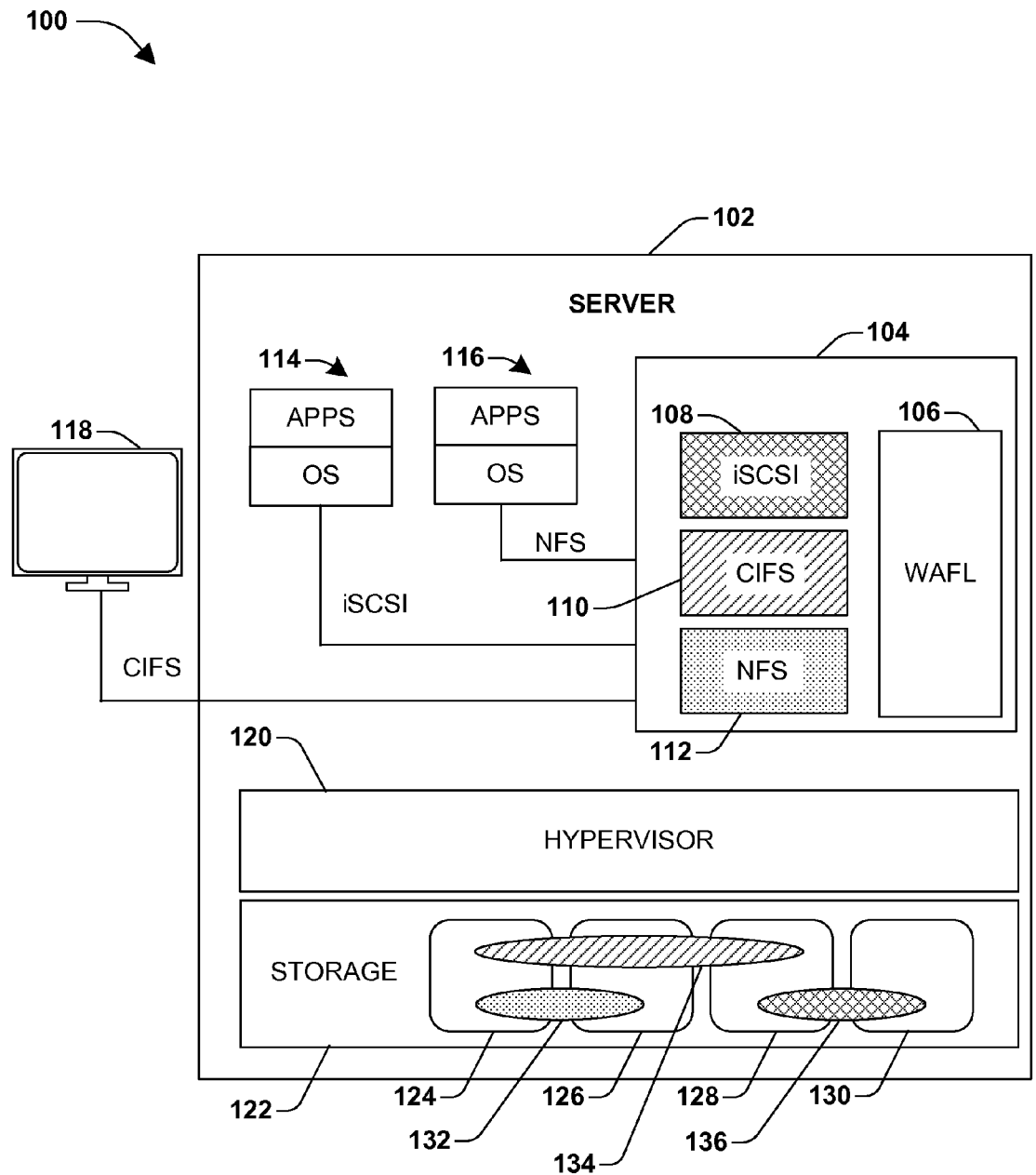
FIG. 1 is a component block diagram illustrating an example computing environment wherein one or more of the provisions set forth herein may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more system and/or techniques for virtual machine rebooting are provided. A host machine (e.g., a server comprising a hypervisor configured to host virtual machines using hardware of the server) may host a virtual machine. The virtual machine may be associated with virtual machine reboot information comprising information used during a mounting phase, a replay phase, and/or other phases of a virtual machine reboot sequence of the virtual machine. For example, the virtual machine reboot information may comprise virtual machine operating system buffers, user metadata buffers (e.g., inode buffers), file system metadata buffers, etc.

As provided herein, the virtual machine reboot information may be cached within a host memory, such as within relatively fast non-persistent RAM (e.g., as opposed to merely within persistent storage, such as a hard drive or other storage device, of the host machine), to create cached virtual machine reboot information. For example, the virtual machine may utilize the host memory as a RAMDISK. In this way, the cached virtual machine reboot information may be quickly retrieved from the host memory (e.g., on the order of 100 to 1,000 times faster to read 1 buffer of 1 kb of data, such as within milliseconds instead of microseconds) during reboot of the virtual machine, such as during reboot from a failure or restart of the virtual machine, for example.

FIG. 1 illustrates an example of an environment 100 within which virtual machine rebooting may be implemented. The environment 100 comprises a server 102 (e.g., or any suitable computing device, system, etc.). The server 102 comprises a hypervisor 120 configured to host virtual machines. The server 102 comprises storage 122, such as a first storage structure 124, a second storage structure 126, a third storage structure 128, a fourth storage structure 130, and/or other storage structures (e.g., memory, drives, etc.). The server 102 may host, through the hypervisor 120, a virtualized storage environment 104. The virtualized storage environment 104 may comprise a storage file system 106, such as a write anywhere file layout (WAFL).

The storage file system 106 may store data, such as data received from a first client 114 (e.g., a first virtual machine hosted by the hypervisor 120) utilizing an internet small computer system interface (iSCSI) protocol 108, a second client 116 (e.g., a second virtual machine hosted by the hypervisor 120) utilizing a network file system (NFS) protocol 112, a third client 118 utilizing a common internet file system (CIFS) protocol 110, within the storage 122. For example, data from the first client 114 may be stored, within a first storage volume 136, across the third storage structure 128 and the fourth storage structure 130. Data from the second client 116 may be stored, within a second storage volume 132, across the first storage structure 124 and the second storage structure 126. Data from the third client 118 may be stored, within a third storage volume 134, across the first storage structure 124, the second storage structure 126, and the third storage structure 128. In this way, the virtualized storage environment 104, hosted as a virtual storage application and/or a virtual machine by the hypervisor 120, may provide data storage for various clients.

It may be appreciated that virtual machine rebooting may be implemented for the environment 100. For example, a caching component may be implemented for the server 102. The caching component may be configured to cache virtual machine reboot information, associated with virtual machines hosted by the server 102, within memory of the server 102, and may utilize the cached virtual machine reboot information to reboot such virtual machines in a relatively quick manner (e.g., as compared to utilizing virtual machine reboot information stored within persistent storage, such as hard drives, of the server 102).

It may be appreciated that virtual machine rebooting may be implemented within a variety of computing environments, such as within a server, a personal computer, a desktop computer, a laptop, a tablet, a wearable, a cluster computing environment, a non-cluster computing environment, a virtualized environment, a cloud environment, a hypervisor, or any other device, etc. configured to host virtual machines, and is not limited to any example(s) provided herein (e.g., configured to run applications, such as a web-server, an app-server, a database, etc.).

Figure 2:
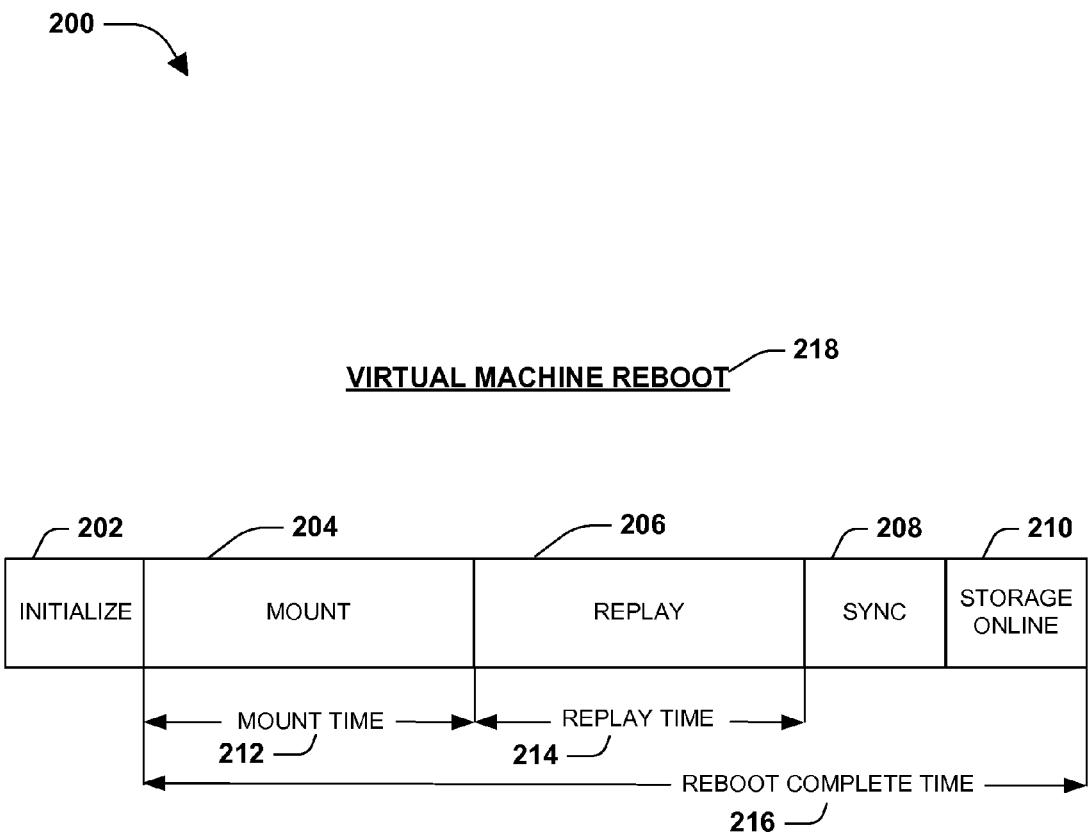
FIG. 2 is an illustration of an example of a virtual machine reboot sequence.

FIG. 2 illustrates an example 200 of a virtual machine reboot sequence 218. The virtual machine reboot sequence 218 may be performed to reboot a virtual machine in the event a failure or other restart of the virtual machine occurs (e.g., a software failure affecting the virtual machine but not a host machine hosting the virtual machine; a user of the virtual machine may restart the virtual machine; etc.). The virtual machine reboot sequence 218 may comprise an initialization phase 202, a mount phase 204, a replay phase 206, a synchronization phase 208, a storage online phase 210 (e.g., logical unit number (LUN) online phase), and/or other phases (e.g., a core dump phase, a POST kernel module load phase, a core save on boot phase, a V-NVRAM load phase, a file system mount phase, a file system replay phase, etc.). The mount phase 204 and/or the replay phase 206 may involve loading volume metadata blocks and/or user blocks that may have been affected by the failure/shutdown. A mount time 212 of the mount phase 204 and/or a replay time 214 of the replay phase 206 may be significantly impacted based upon the overall downtime and/or the amount of active volumes associated with the virtual machine (e.g., a number of volumes to which a virtual storage appliance, hosted by the virtual machine, may provide clients with data storage access), which may affect an overall reboot time, such as the reboot complete time 216, for the virtual machine reboot sequence 218. The virtual storage appliance may be unable to process client requests for data stored within the volumes until the virtual machine reboot sequence 218 is completed.

As provided herein, virtual machine reboot information, which may be used during the mount phase 204, the replay phase 206, and/or other phases, may be cached as cached virtual machine reboot information within host memory of the host machine that hosts the virtual machine. The cached virtual machine reboot information may be retrieved relatively quickly from the host memory (e.g., as opposed to from persistent storage, such as a hard drive, of the host device), which may reduce the mount time 212, the replay time 214, and/or the reboot complete time 216 so that the virtual storage appliance may accept and/or process client requests sooner.

Figure 3:
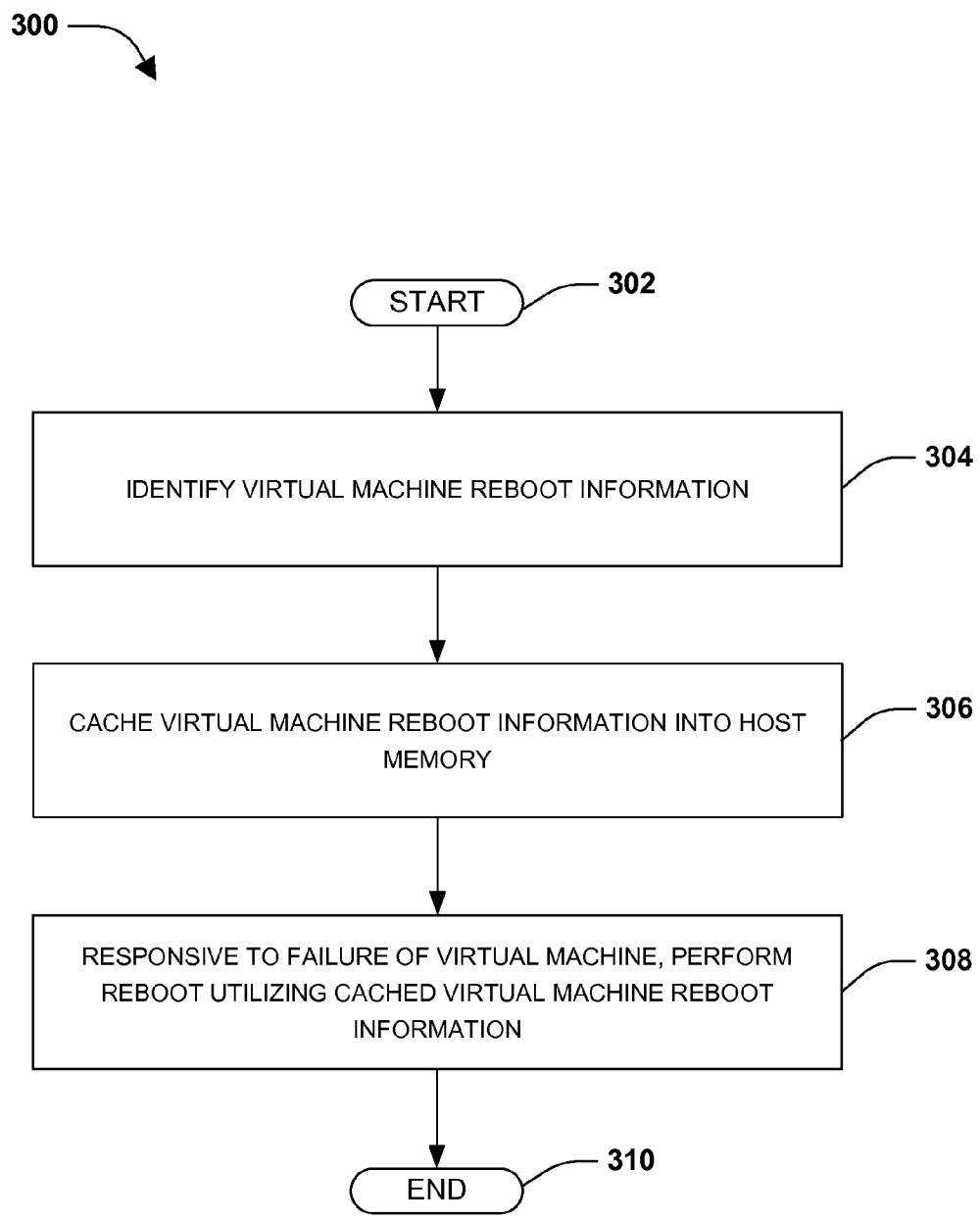
FIG. 3 is a flow chart illustrating an exemplary method of virtual machine rebooting.

One embodiment of virtual machine rebooting is illustrated by an exemplary method 300 of FIG. 3. At 302, the method starts. A virtual machine may be hosted on a host machine (e.g., a server host machine may comprise a hypervisor configured to host the virtual machine using resources of the server host machine). The virtual machine may store a guest operating system, user files, application data, and/or other data, within a virtual machine storage file (e.g., a virtual machine disk (vmdk) file). The virtual machine storage file may be stored within persistent storage (e.g., a hard drive or other storage device) of the host machine. In an example, the virtual machine may comprise a virtual storage appliance configured to provide clients with access to data stored within one or more storage volumes.

At 304, virtual machine reboot information associated with virtual machine memory of the virtual machine may be identified. In an example, a write operation to a metadata buffer and/or a virtual non-volatile random access memory (V-NVRAM) within the virtual machine memory may be identified as comprising the virtual machine reboot information. In another example, a volume identifier and/or a data block identifier may be used to identify the virtual machine reboot information (e.g., identification information used to locate volume mounting and/or replay information) within the virtual machine memory. The virtual machine reboot information may comprise virtual machine reboot mounting data, virtual machine reboot replay data, and/or other data that may be used to reboot the virtual machine. In an example, the virtual machine reboot information may comprise a buffer within a virtual machine system RAM, a file system metadata buffer of the virtual machine, a V-NVRAM log, a user data buffer, an inode buffer, or any other data used to reboot the virtual machine.

At 306, the virtual machine reboot information may be cached into a host memory of the host machine (e.g., host system RAM, such as relatively fast volatile memory, as opposed to relatively slower persistent storage devices such as hard drives) as cached virtual machine reboot information. In an example, the host memory may be exposed to the virtual machine as a RAMDISK exposed as a small computer system interface (SCSI) disk, an integrated drive electronics (IDE) disk, or a storage device. In an example, the virtual machine reboot information may be cached into a V-NVRAM of the RAMDISK (e.g., into a vmdk file). In this way, the cached virtual machine reboot information may be stored in relatively fast memory of the host machine (e.g., as opposed to merely being stored in a relatively slower storage device of the host machine).

In an example, a restart (e.g., an administrator may restart the virtual machine) or failure of the virtual machine may occur (e.g., a software failure that may affect the virtual machine, but not the host machine, and thus the cached virtual machine reboot information may remain within the host memory). At 308, responsive to the restart or the failure, a reboot of the virtual machine may be performed utilizing the cached virtual machine reboot information cached within the host memory. For example, the cached virtual machine reboot information may be utilized to perform a reboot mounting operation (e.g., during the mount stage 204), a reboot replay operation (e.g., during the replay stage 206), and/or during other stages of the virtual machine reboot sequence 218. In an example, if cached virtual machine reboot information is identified within the host memory, then the cached virtual machine reboot information is retrieved from the host memory, otherwise the virtual machine reboot information is retrieved from persistent storage of the host machine. Retrieving the cached virtual machine reboot information from the host memory (e.g., as opposed to the slower persistent storage) may reduce the reboot complete time 216 of the virtual machine reboot sequence 218 so that the virtual machine may be operational sooner (e.g., the virtual storage appliance may service client I/O requests sooner). At 310, the method ends.

Figure 4A:
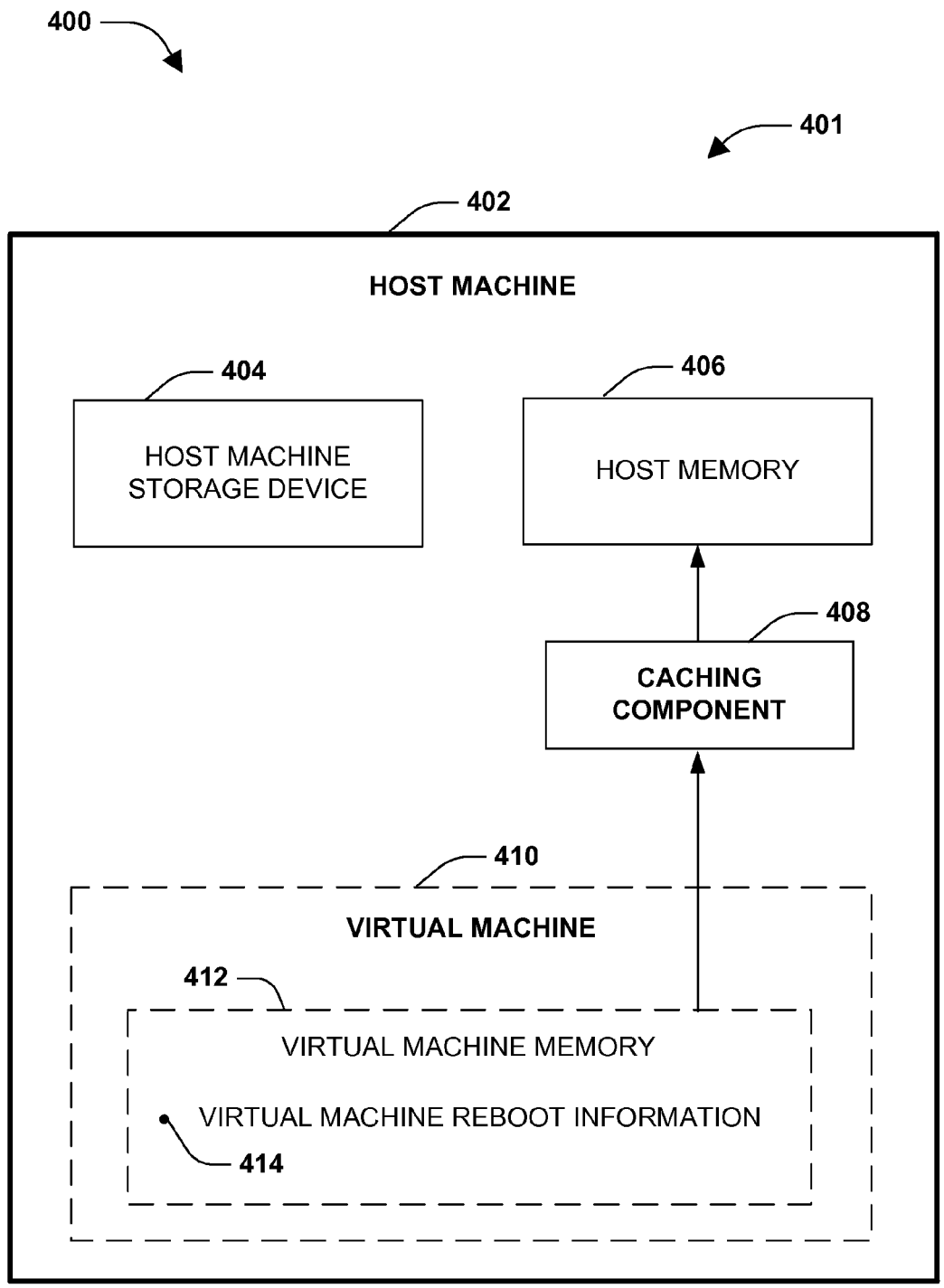
FIG. 4A is a component block diagram illustrating an exemplary system for virtual machine rebooting, where virtual machine reboot information is cached within host memory.
Figure 4B:
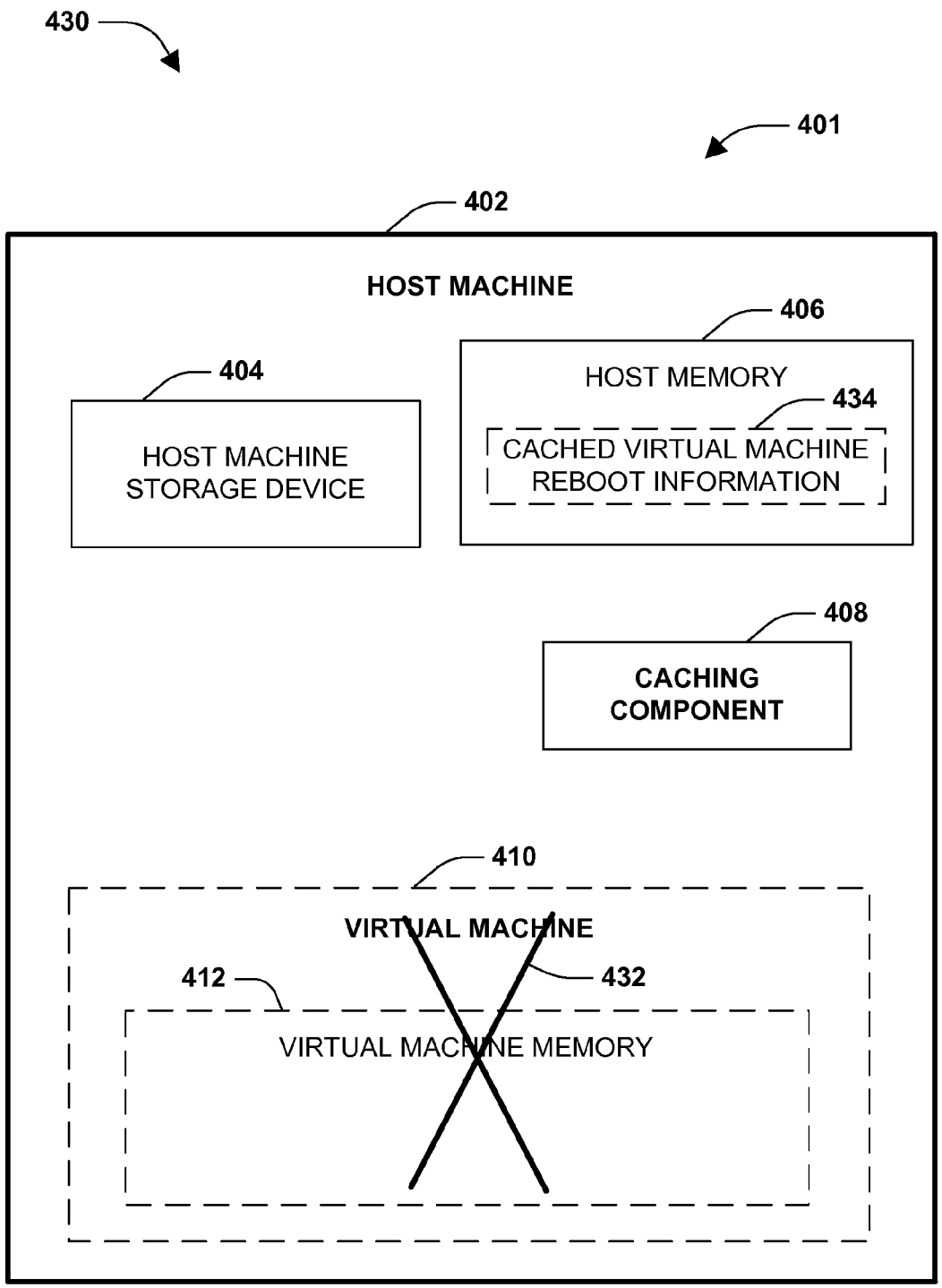
FIG. 4B is a component block diagram illustrating an exemplary system for virtual machine rebooting, where a failure of a virtual machine occurs.
Figure 4C:
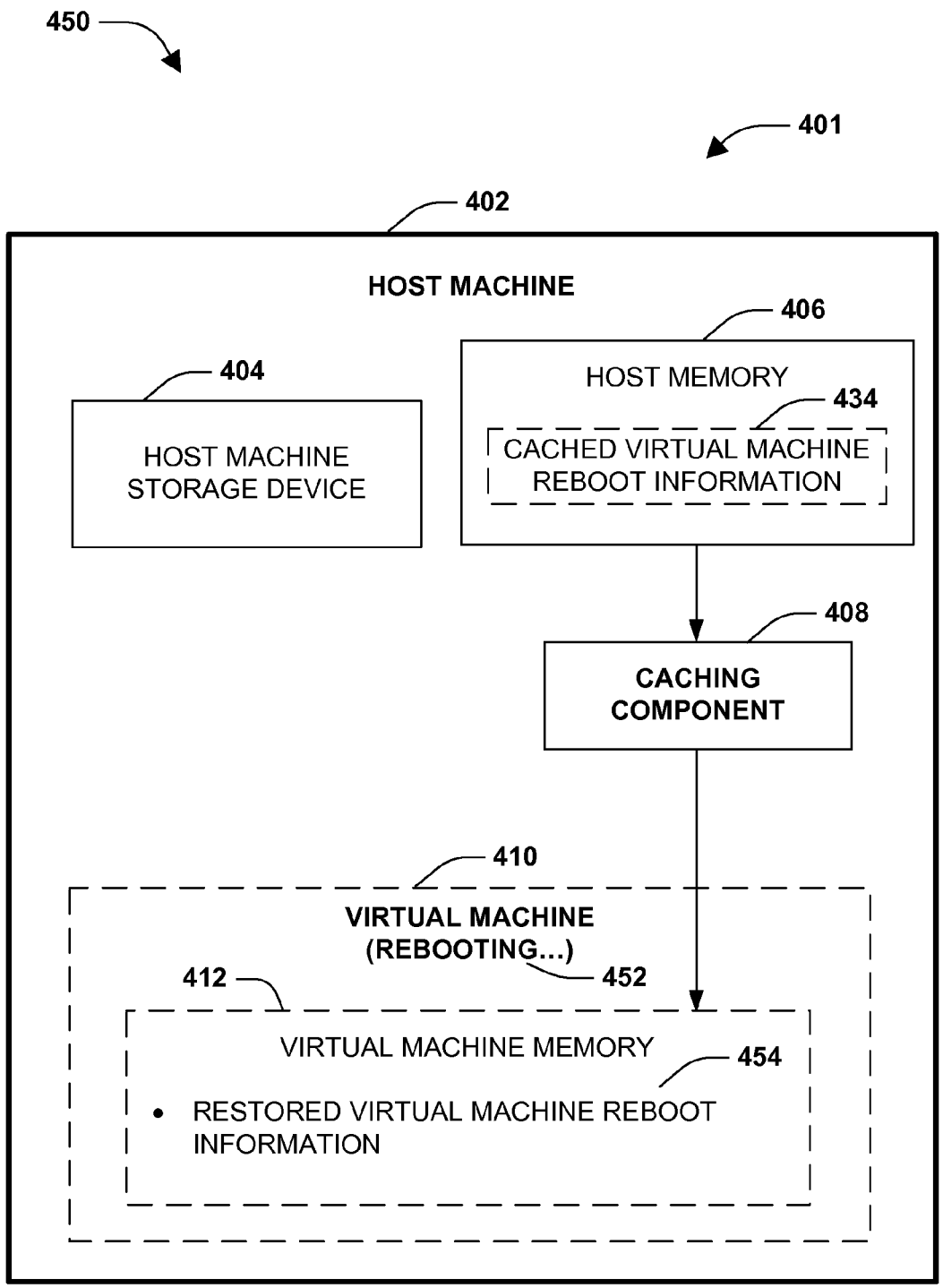
FIG. 4C is a component block diagram illustrating an exemplary system for virtual machine rebooting utilizing cached virtual machine reboot information.

FIGS. 4A-4C illustrate examples of a system 401, comprising a caching component 408, for virtual machine rebooting. FIG. 4A illustrates an example 400 of the caching component 408 being associated with a host machine 402 that hosts a virtual machine 410. The host machine 402 may comprise a host machine storage device 404 (e.g., relatively slower persistent storage, such as a hard drive) within which the virtual machine 410 may store (e.g., within a virtual machine hard disk file) a guest operating system, user data, a virtual storage appliance (e.g., configured to provide clients with access to data stored within volumes), and/or file data. The virtual machine 410 may utilize a virtual machine memory 412 (e.g., which may be persisted to the host machine storage device 404) to store various data, such as virtual machine reboot information 414.

As provided herein, the caching component 408 may be configured to identify the virtual machine reboot information 414 within the virtual machine memory 412 (e.g., utilizing a volume identifier of a volume accessible through the virtual storage appliance and/or a data block identifier identifying a location of the virtual machine reboot information 414). The virtual machine reboot information 414 may comprise information, such as a user data buffer, an inode buffer, a V-NVRAM log, a file system metadata buffer, volume mounting information, volume replay information, etc., used to reboot the virtual machine 410 in the event a failure or restart of the virtual machine 410 occurs. The caching component 408 may cache the virtual machine reboot information 414 within the host memory 406 (e.g., utilizing the volume identifier and/or the data block identifier to index the virtual machine reboot information within the host memory) as cached virtual machine reboot information 434, illustrated in FIG. 4B.

FIG. 4B illustrates an example 430 of the virtual machine 410 failing. For example, a failure 432, such as a software failure, of the virtual machine 410 may affect operability of the virtual machine 410 (e.g., resulting in an inability for the virtual storage appliance to service client storage requests). The failure 432 may be isolated from the host machine 402, such that the cached virtual machine reboot information 434 may remain within the host memory 406.

FIG. 4C illustrates an example 450 of rebooting 452 the virtual machine 410 after the failure 432. For example, the virtual machine reboot sequence 218 may be performed to reboot 452 the virtual machine 410. The virtual machine reboot sequence 218, such as the mount phase 204 and the replay phase 206, may utilize the cached virtual machine reboot information 434 for rebooting 452 the virtual machine 410. Accordingly, the caching component 408 may retrieve the cached virtual machine reboot information 434 from the host memory 406, which may be relatively faster (e.g., in the order of 100 to 1,000 time faster) than obtaining the virtual machine reboot information from the host machine storage device 404. In an example the caching component 408 retrieves the cached virtual machine reboot information 434 as restored virtual machine reboot information 454 (e.g., stored within the virtual machine memory 412). In this way, the cached virtual machine reboot information 434 or the restored virtual machine reboot information 454 may be utilized to efficiently reboot the virtual machine 410 in a shorter amount of time than if the virtual machine reboot information was retrieved from the host machine storage device 404.

Figure 5:
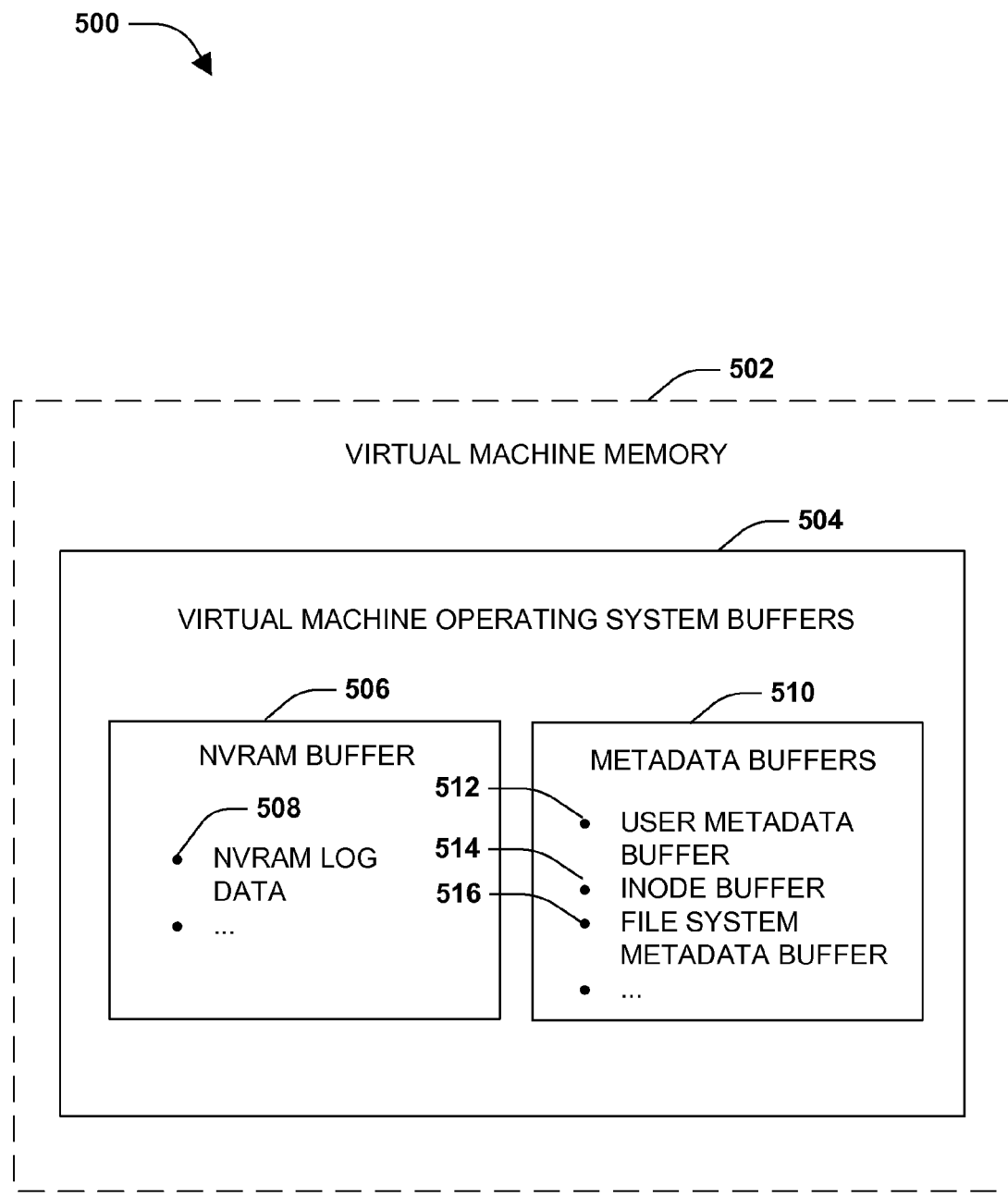
FIG. 5 is an illustration of an example of virtual machine reboot information.

FIG. 5 illustrates an example 500 of virtual machine reboot information. A virtual machine operating system, of a virtual machine, may be associated with a virtual machine memory 502. The virtual machine memory 502 may comprise virtual machine operating system buffers 504. The virtual machine operating system buffers 504 may comprise an NVRAM buffer 506 (e.g., a V-NVRAM buffer), metadata buffers 510, and/or other information associated with the virtual machine. Virtual machine reboot information may be identified within the NVRAM buffer 506, the metadata buffers 510, and/or the virtual machine operating system buffers 504. For example, the virtual machine reboot information may comprise NVRAM log data 508, a user metadata buffer 512, an inode buffer 514, a file system metadata buffer 516, and/or other data used to reboot the virtual machine. As provided herein, the virtual machine reboot information may be cached within host memory of a host machine that hosts the virtual machine, so that the virtual machine reboot information may be quickly retrieved from the host memory for rebooting the virtual machine in the event a failure or restart of the virtual machine occurs.

Figure 6:
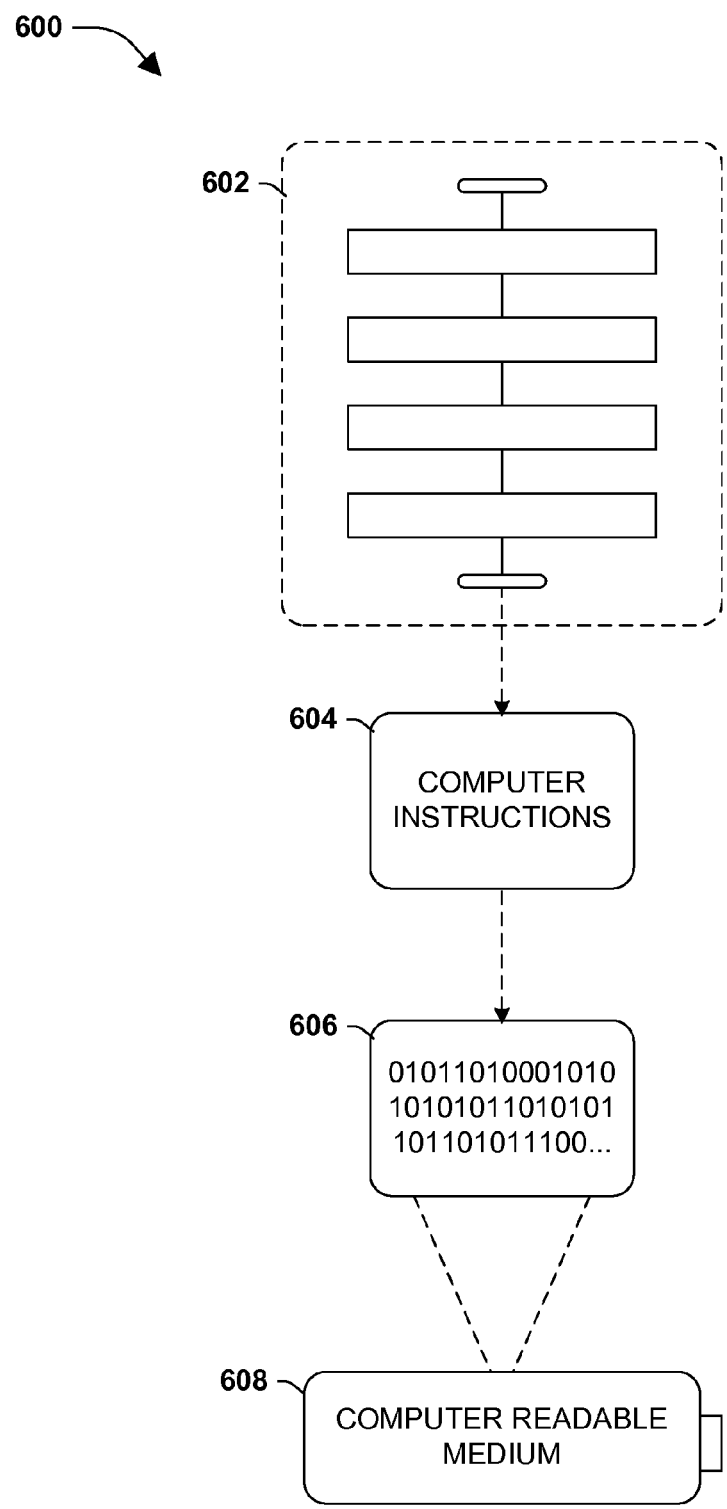
FIG. 6 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 6, wherein the implementation 600 comprises a computer-readable medium 608, such as a CD-R, DVD-R, flash drive, a platter of a hard disk drive, etc., on which is encoded computer-readable data 606. This computer-readable data 606, such as binary data comprising at least one of a zero or a one, in turn comprises a set of computer instructions 604 configured to operate according to one or more of the principles set forth herein. In some embodiments, the processor-executable computer instructions 604 are configured to perform a method 602, such as at least some of the exemplary method 300 of FIG. 3, for example. In some embodiments, the processor-executable instructions 604 are configured to implement a system, such as at least some of the exemplary system 401 of FIGS. 4A-4C, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   caching virtual machine reboot information of a virtual machine into a host memory of a host machine that hosts the virtual machine, wherein the virtual machine provides clients access to volumes in a virtualized storage environment and the virtual machine reboot information at least comprises volume metadata blocks and a file system metadata buffer; and
   responsive to a restart of the virtual machine, the host machine determining that the virtual machine reboot information is cached in the host memory instead of persistent storage of the host machine,
      wherein determining that the virtual machine reboot information is cached in the host memory comprises identifying the virtual machine reboot information in the host memory based, at least in part, on at least one of a write operation to the file system metadata buffer of the virtual machine and a write operation to a virtual non-volatile random access memory,
      wherein identifying the virtual machine reboot information comprises intercepting the write operation to at least one of the metadata buffer and the virtual non-volatile random access memory of the virtual machine, the write operation comprising the virtual machine reboot information; and
   rebooting the virtual machine utilizing the cached virtual machine reboot information cached within the host memory, wherein rebooting comprises loading the volume metadata blocks and the file system metadata buffer from the host memory during a mount phase of the reboot.

2. The method of claim 1, wherein rebooting the virtual machine comprises:
   utilizing the cached virtual machine reboot information to perform a reboot replay operation.

3. The method of claim 1, further comprising:
   exposing the host memory to the virtual machine as a RAMDISK.

4. The method of claim 3, wherein the caching comprises caching the virtual machine reboot information in the RAMDISK.

5. The method of claim 4, wherein caching the virtual machine reboot information in the RAMDISK comprises caching the virtual machine reboot information in a virtual non-volatile random access memory of the RAMDISK.

6. The method of claim 1, wherein the virtual machine reboot information further comprises at least one of a user data buffer and an inode buffer.

7. The method of claim 1, wherein identifying the virtual machine reboot information comprises:
   utilizing a volume identifier and a data block identifier to identify the virtual machine reboot information.

8. The method of claim 1, wherein the restart is based on a failure of the virtual machine that is isolated from the host machine.

9. The method of claim 1, further comprising:
   exposing the host memory, to the virtual machine, as a RAMDISK exposed as at least one of a small computer system interface (SCSI) disk, an integrated drive electronics (IDE) disk, and a storage device.

10. The method of claim 1, wherein rebooting the virtual machine comprises:

searching the host memory for the cached virtual machine reboot information; and responsive to identifying the cached virtual machine reboot information within the host memory, retrieving the cached virtual machine reboot information from the host memory.

11. A system comprising:
a processor;
memory;
persistent storage;
a set of one or more computer-readable media comprising a hypervisor to host virtual machines and comprising virtual machine reboot instructions executable by the processor to cause the system to,
cache virtual machine reboot information for a virtual machine into the memory as cached virtual machine reboot information instead of storing the virtual machine reboot information into the persistent storage, wherein the virtual machine reboot information at least comprises volume metadata blocks and a file system metadata buffer; and
responsive to a restart of the virtual machine that is not a restart of the system or the hypervisor,
identify the cached virtual machine reboot information for the virtual machine in the memory, wherein the instructions to identify the cached virtual machine reboot information comprise instructions to identify a write operation to the file system metadata buffer of the virtual machine or a write operation to a virtual non-volatile random access memory of the virtual machine as comprising at least one of a volume identifier and a data block identifier corresponding to location of volume mounting information and replay information, wherein the virtual machine reboot information comprises the volume mounting information and the replay information; and
reboot the virtual machine utilizing the cached virtual machine reboot information cached within the memory, wherein the instructions to perform the reboot comprise instructions to load the volume metadata blocks and the file system metadata buffer from the memory during a mount phase of the reboot.

12. A non-transitory computer readable medium comprising instructions for rebooting a virtual machine from memory instead of persistent storage, the instructions to:
cache virtual machine reboot information for a virtual machine into a host memory of a host machine that hosts the virtual machine, wherein the virtual machine provides clients access to volumes in a virtualized storage environment and the virtual machine reboot information at least comprises volume metadata blocks and a file system metadata buffer; and
responsive to a restart of the virtual machine,
identify the virtual machine reboot information in the host memory, wherein the instructions to identify the virtual machine reboot information in the host memory comprise instructions to identify a write operation to the file system metadata buffer of the virtual machine or a write operation to a virtual non-volatile random access memory of the virtual machine as comprising at least one of a volume identifier and a data block identifier corresponding to location of volume mounting information and replay information, wherein the virtual machine reboot information comprises the volume mounting information and replay information; and
reboot the virtual machine utilizing the identified virtual machine reboot information cached within the host memory, wherein the instructions to perform the reboot comprises instructions to load the volume metadata blocks and the file system metadata buffer from the host memory during a mount phase of the reboot.

13. The system of claim 11, wherein the instructions to cache comprise instructions executable by the processor to cause the system to:
write the virtual machine reboot information into the virtual non-volatile random access memory which is in a RAMDISK, wherein the hypervisor exposes the memory to the virtual machine as the RAMDISK.

14. The system of claim 11, wherein the instructions to reboot comprise instructions executable by the processor to cause the system to:
search the memory for the cached virtual machine reboot information; and
responsive to identification of the cached virtual machine reboot information for the virtual machine within the memory, retrieve the cached virtual machine reboot information from the memory.

15. The method of claim 1, wherein the host memory comprises a flash drive or flash memory.

16. The system of claim 11, wherein the memory comprises a flash drive or flash memory.

17. The non-transitory computer readable medium of claim 12, wherein the host memory comprises a flash drive or flash memory.

* * * * *